Patented June 11, 1940

2,204,336

UNITED STATES PATENT OFFICE 2,204,336

FIBER

Earle O. Whittier and Stephen P. Gould, Washington, D. C., dedicated to the free use of the People of the United States of America No Drawing. Original application August 12, 1937, Serial No. 158,822. Divided and this application May 19, 1938, Serial No. 208,829

3 Claims. (Cl. 18—54)

(Granted under the act of March 3, 1883, as amended April 30, 1928; 370 O. G. 757)

This application is made under the act of March 3, 1883, as amended by the act of April 30, 1928, and the invention herein described and claimed, if patented, may be manufactured and used by or for the Government of the United States for governmental purposes without the payment to us of any royalty thereon.

This application is a division of the one filed by us on August 12, 1937, bearing Serial No. 158,822.

We hereby dedicate the invention herein described to the free use of the People of the United States of America to take effect on the granting of a patent to us.

Our invention deals with fibers made from casein.

The objects of our invention are to produce dispersions of casein (mixed usually with plasticizers and salts), which can be extruded into fibers having the requisite characteristics of strength, water resistance, flexibility, fire-resistance, and softness necessary to make them suitable for use in textiles, and are valuable as substitutes for wool and other fibers.

In forming dispersions suitable for extrusions, the casein is dissolved or dispersed in a solution of some protein solvent. Plasticizers, salts for increasing the strength and water-resistance, and fireproofing ingredients may be incorporated in the dispersion.

Our fibers may be made fire-retardant as illustrated by the following examples:

Example 1

| | |
|---|---|
| Casein | 24 |
| Water | 169.3 |
| Sodium aluminate | 0.63 |
| Sodium hydroxide solution (2N) | 6 |

(This composition is improved by the addition of plasticizers)

This solution is extruded into a bath comprising 3 pts.—phosphoric acid, 5—formaldehyde and 92—ethanol. Thus, aluminum phosphate is formed in the fibers, and acts as a fire-retardant. The fibers were subjected to the application of a flame, and they charred only slightly. We also found that their water-repellency was excellent.

Example 2

| | |
|---|---|
| Casein | 24 |
| Water | 205.5 |
| Trisodium phosphate | 5 |
| Oleic acid | 5 |
| Sodium aluminate | 0.5 |

The bath composition is: 2—$H_2SO_4$, 5—formaldehyde, 10—glucose, 83—water. Aluminum phosphate is again formed as the filaments are precipitated. They also show fire retardance. The fibers are excellent with respect to flexibility, water resistance, etc., as well.

Example 3

| | |
|---|---|
| Casein | 24 |
| Water | 204.5 |
| Oleic acid | 5 |
| Sodium aluminate | 0.5 |
| Sodium hydroxide solution (2N) | 1 |
| Sodium silicate solution | 5 |

The bath composition may comprise the same ingredients as in Example 2. The fibers exhibit considerable fire retardance, and in addition, other desirable properties, as set forth under Example 2. As a variation from the above procedure, the sodium aluminate can be omitted, and the solution extruded into a bath comprising acetic acid and calcium chloride. The filaments, however, are somewhat less satisfactory.

Dispersion and bath temperatures in the foregoing examples are usually 70° C., but other temperatures ranging from 50° C. up, may be employed as well.

It will be understood that our invention is not restricted to any of the examples given, as proportions, constituents, and substitutes may be varied over a wide range.

It is also to be understood that greater fire resistance may be obtained by an increase in the inorganic constituents, but this often results in an increase in viscosity so that extrusion is more difficult.

Having thus described our invention what we claim for Letters Patent is:

1. A method for producing fire retardant and water resistant fibers, which comprises subjecting a dispersion comprising casein and sodium silicate having an alkaline reaction in the form of fine streams to the action of a bath comprising an acid and calcium chloride, whereby calcium silicate is formed in the fibers.

2. A method for producing fire retardant and water resistant fibers, which comprises subjecting a dispersion comprising casein and sodium silicate having an alkaline reaction in the form of fine streams to the action of a bath comprising acetic acid and calcium chloride, whereby calcium silicate is formed in the fibers.

3. As an article of manufacture, a fire retardant and water resistant fiber, which comprises casein and calcium silicate.

EARLE O. WHITTIER.
STEPHEN P. GOULD.